(12) United States Patent
Rakoto-Sam et al.

(10) Patent No.: US 12,216,320 B2
(45) Date of Patent: Feb. 4, 2025

(54) MOUNTING SYSTEM FOR REVERSIBLE CASSETTE

(71) Applicant: BELDEN CANADA ULC, Saint-Laurent (CA)

(72) Inventors: Lucas Rakoto-Sam, Montreal (CA); Simon Lyonnais-Bourque, Montreal (CA); Dwayne Crawford, Pointe-Claire (CA)

(73) Assignee: BELDEN CANADA ULC, Saint-Laurent (CA)

( * ) Notice: Subject to any disclaimer, the term of this patent is extended or adjusted under 35 U.S.C. 154(b) by 321 days.

(21) Appl. No.: 17/932,484

(22) Filed: Sep. 15, 2022

(65) Prior Publication Data
US 2023/0080816 A1    Mar. 16, 2023

Related U.S. Application Data

(60) Provisional application No. 63/261,220, filed on Sep. 15, 2021.

(51) Int. Cl.
*G02B 6/00* (2006.01)
*G02B 6/44* (2006.01)

(52) U.S. Cl.
CPC .................. *G02B 6/4455* (2013.01)

(58) Field of Classification Search
CPC .............. G02B 6/4455; G02B 6/44526; G02B 6/44715; G02B 6/00
See application file for complete search history.

(56) References Cited

U.S. PATENT DOCUMENTS

| | | | |
|---|---|---|---|
| 8,139,913 B2 * | 3/2012 | Bolster | G02B 6/4453 385/139 |
| 9,720,199 B2 * | 8/2017 | Mead | G02B 6/44528 |
| 10,310,206 B2 * | 6/2019 | Takeuchi | H04Q 1/025 |

* cited by examiner

*Primary Examiner* — Jennifer Doan
(74) *Attorney, Agent, or Firm* — MH2 Technology Law Group, LLP

(57) ABSTRACT

A reversible fiber optic cassette is disclosed for mounting in one of a first orientation and a second reversed orientation on a tray a plurality of stabilizing slots. At least one stabilizing member is held within a respective aperture in a cassette bottom such that an L-shaped slot engaging portion extends above the first surface and a second L-shaped slot engaging portion extends above the second surface. Each of the second L-shaped slot engaging portions engages with a respective one of the stabilizing slots when the cassette is on the tray in the first orientation and each of the first slot engaging portions engages with a respective one of the stabilizing slots when the cassette is on the tray in the second reversed orientation.

20 Claims, 11 Drawing Sheets

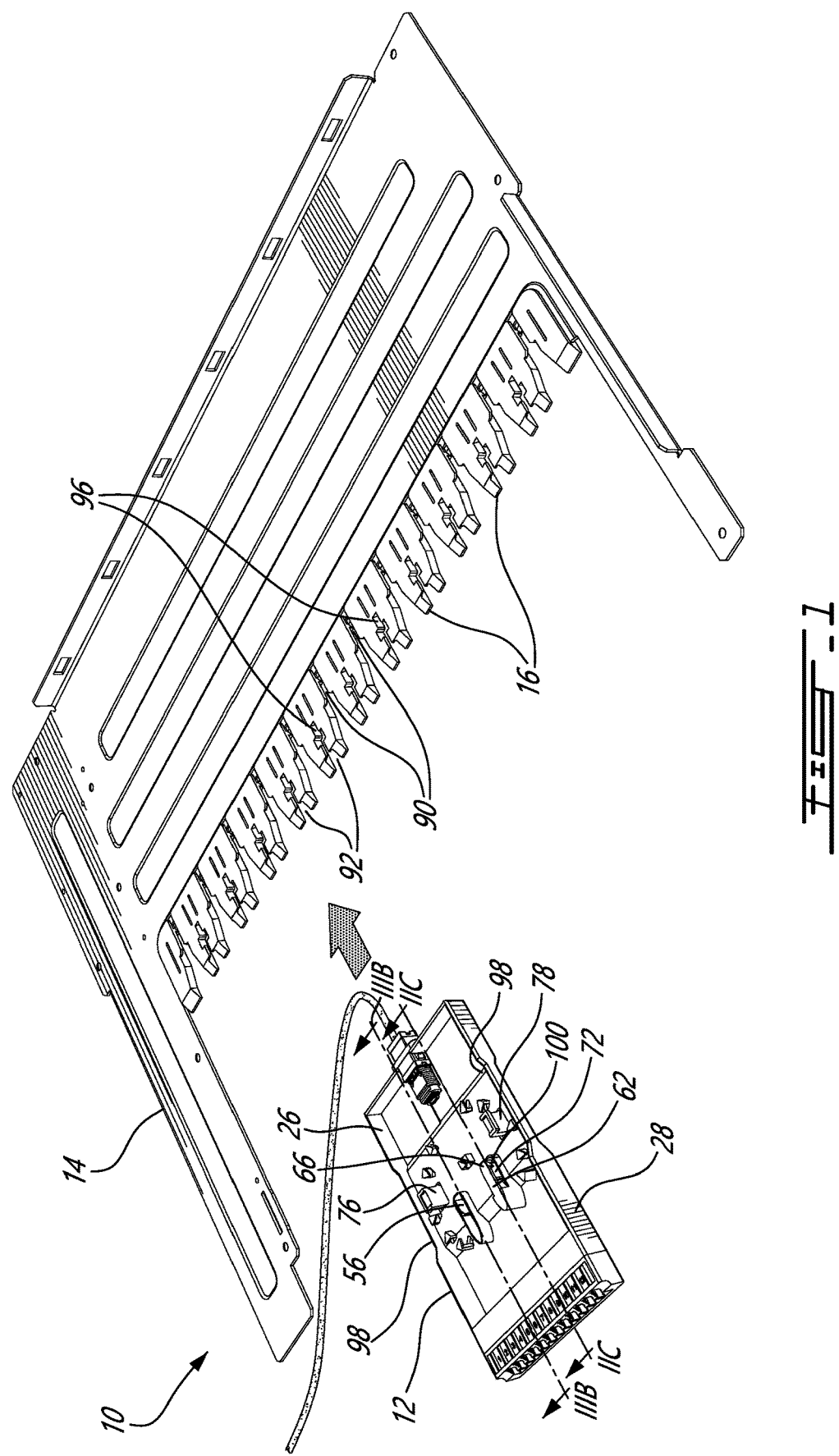

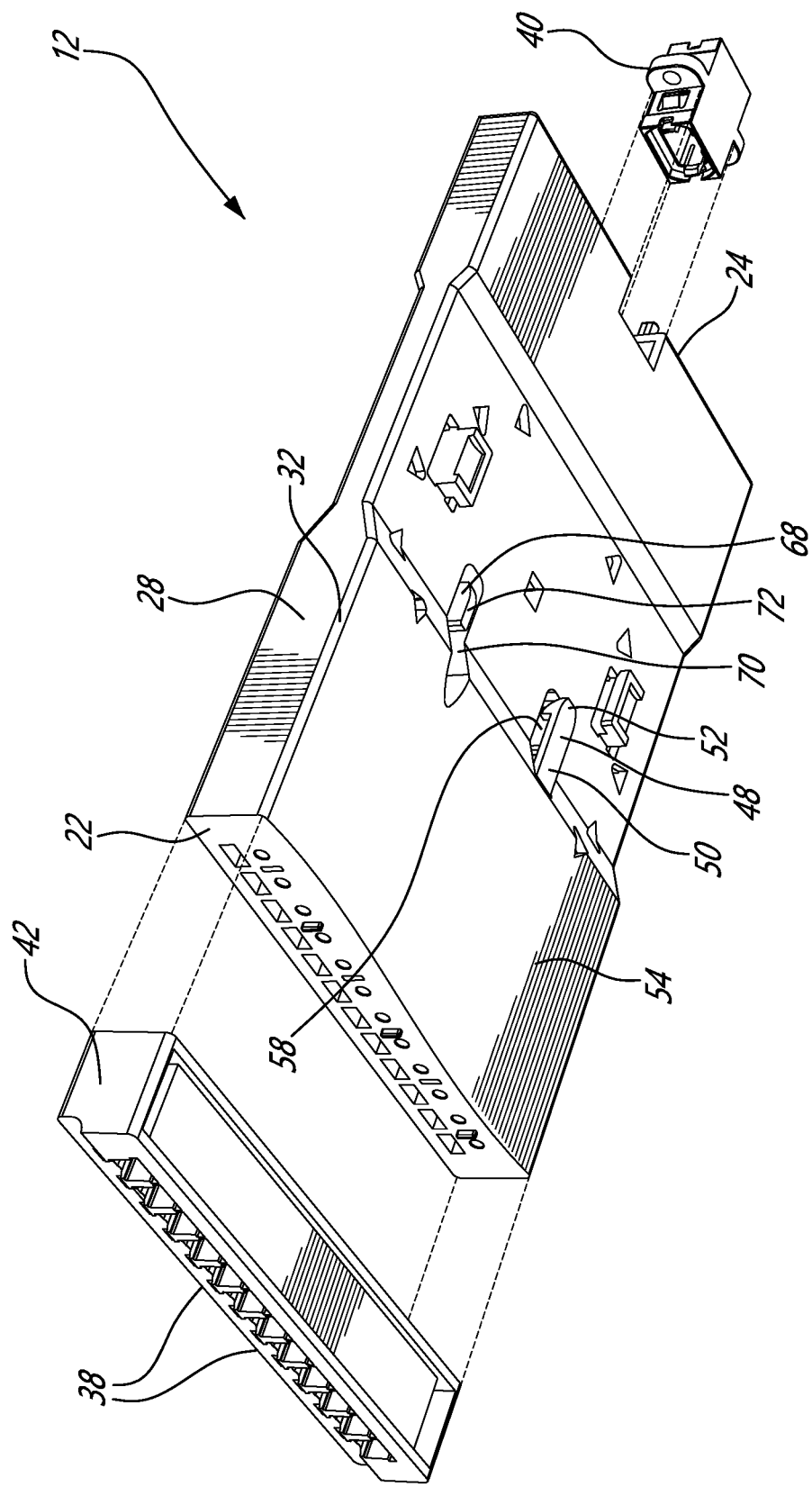

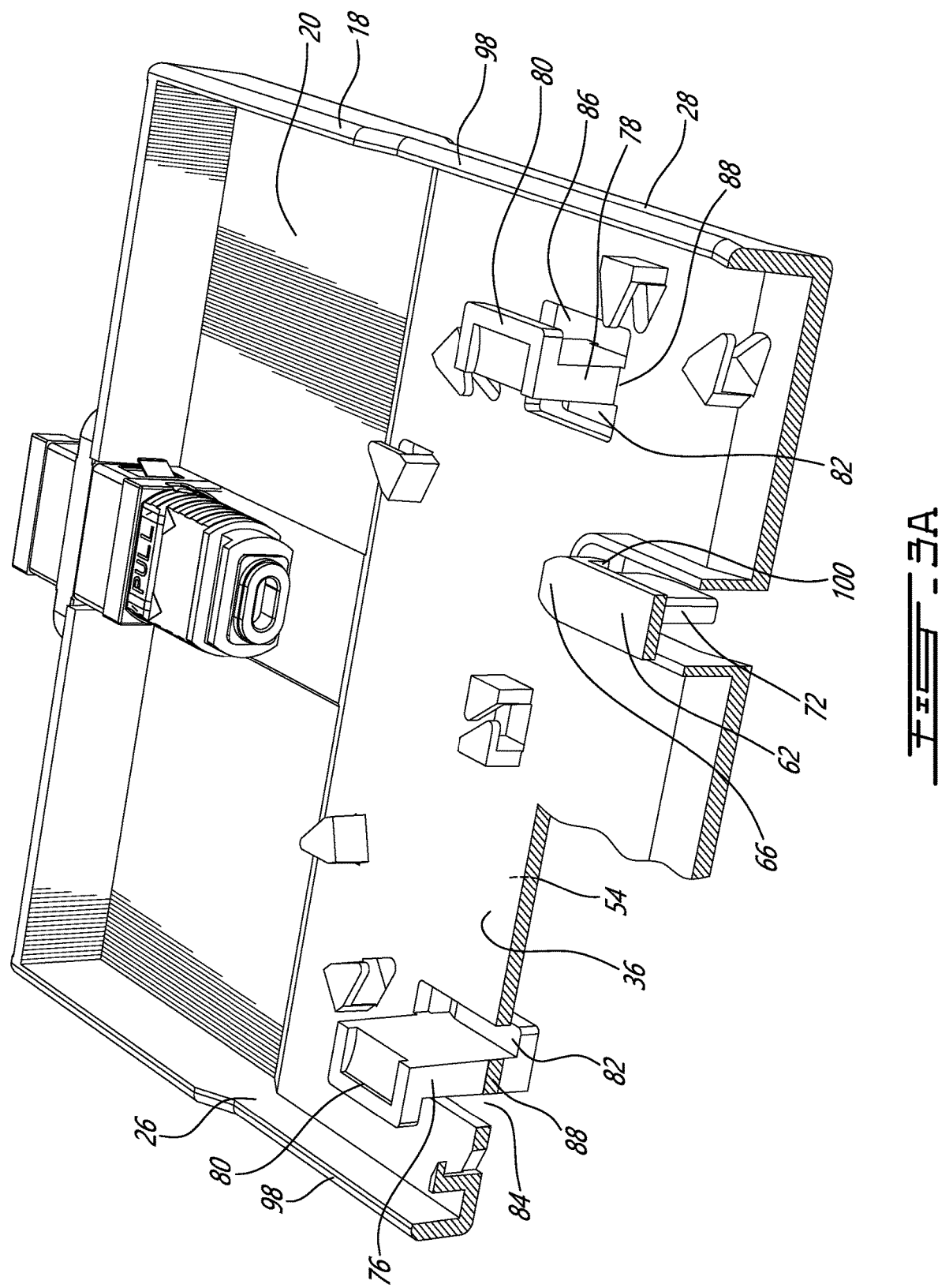

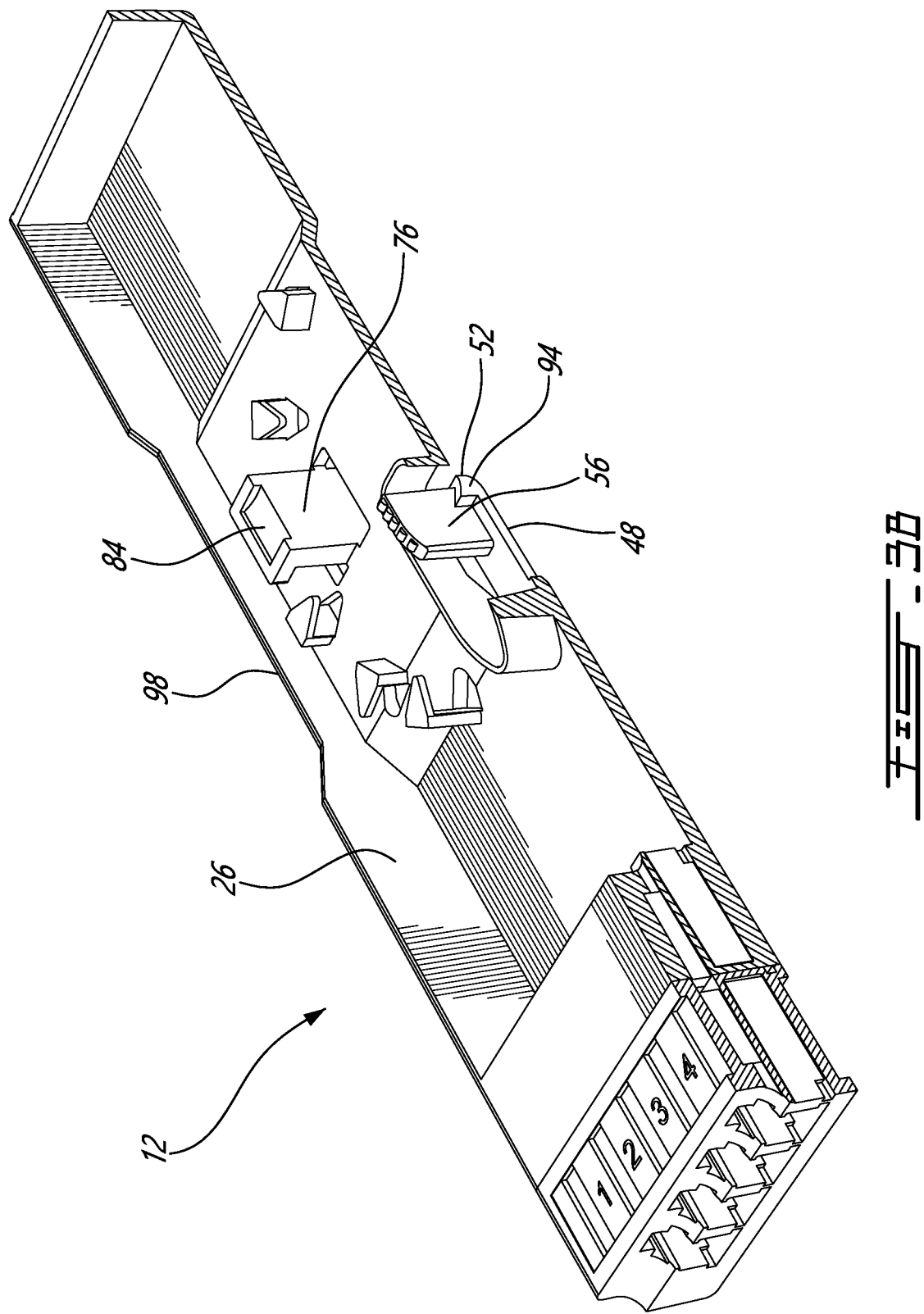

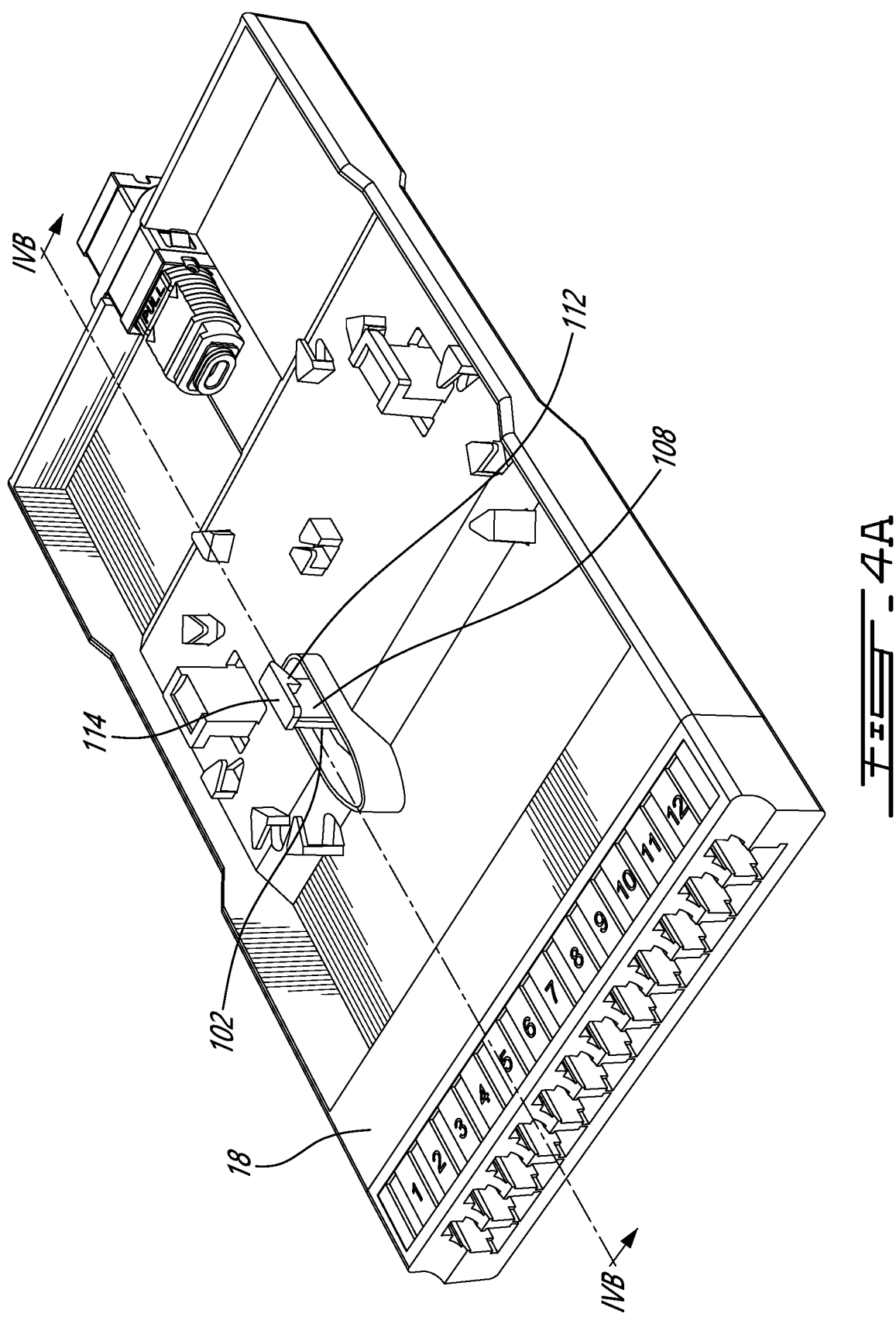

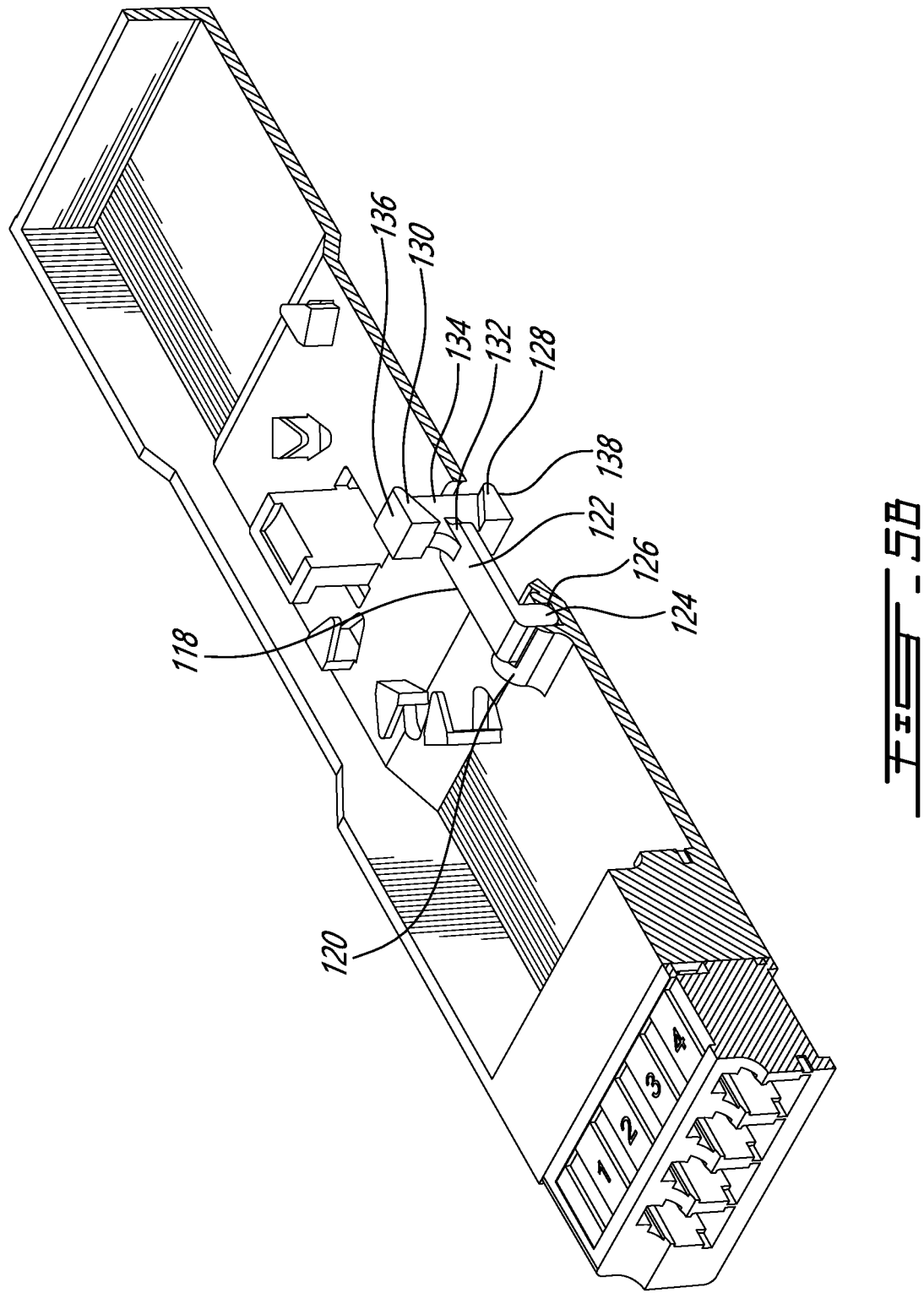

MOUNTING SYSTEM FOR REVERSIBLE CASSETTE

CROSS REFERENCE TO RELATED APPLICATIONS

This Application claims priority under 35 USC § 119(e) of U.S. provisional application Ser. No. 63/261,220 filed on Sep. 15, 2021 which is incorporated herein in its entirely by reference.

FIELD OF THE INVENTION

The present invention relates to a mounting system for reversible cassette.

BACKGROUND TO THE INVENTION

The prior discloses reversible cassettes for mounting on a tray. One drawback of these prior art cassettes is that they are typically manufactured from plastic using an injection molding process and difficult to mold.

SUMMARY OF THE INVENTION

The present provides a reversible fiber optic cassette for mounting in one of a first orientation and a second reversed orientation in a rack comprising a cassette receiving tray, the tray comprising a plurality of stabilizing slots. The cassette comprises a cassette body comprising a bottom comprising a first surface and a second surface, at least one stabilizing member held within a respective aperture in the bottom and such that a first L-shaped slot engaging portion of each of the stabilizing members extends above the first surface and a second L-shaped slot engaging portion of each of the stabilizing members extends above the second surface, each of the second L-shaped slot engaging portions for engaging with a respective one of the stabilizing slots when the cassette is on the tray in the first orientation and such that the tray is between an outer end of the second L-shaped slot engaging portions and said second surface and each of the first slot engaging portions for engaging with a respective one of the stabilizing slots when the cassette is on the tray in the second reversed orientation and such that the tray is between an outer end of the first L-shaped slot engaging portion and said first surface.

There is also provided a fiber optic cassette for mounting in one of a first orientation and a second reversed orientation in a rack comprising a cassette receiving tray, the tray comprising a plurality stabilizing slots. The cassette comprises a cassette body comprising a bottom comprising a first surface and a second surface, at least one stabilising member comprising a flat first part, a flat second part and a flat third part comprising a pair of opposed edges, each of the flat first part and the flat second part interconnected at right angles to a respective one of the opposed edges and such that each of the first part and the second part extend away from the third part in opposite directions. The stabilising member is secured within a respective aperture in the bottom and such that the first part is arranged a first distance above and in parallel to the first surface, the flat second part is arranged a second distance below and in parallel to the second surface and the third part intersects the bottom at right angles.

BRIEF DESCRIPTION OF THE DRAWINGS

FIG. 1 provides a right raised perspective view of a reversible cassette and tray in accordance with an illustrative embodiment of the present invention;

FIG. 2B provides an exploded lower right front perspective view of a cassette in accordance with an illustrative embodiment of the present invention;

FIG. 2D provides a in accordance with an illustrative embodiment of the present invention;

FIG. 3A provides a sectional view along line IIIA-IIIA in FIG. 2A;

FIG. 3B provides a sectional view along line IIIB-IIIB in FIG. 1;

FIG. 4A provides a raised right front perspective view of a cassette in accordance with a second illustrative embodiment of the present invention;

FIG. 5B provides a sectional view along line VB-VB in FIG. 5A.

DETAILED DESCRIPTION OF THE ILLUSTRATIVE EMBODIMENTS

Figure 2A:
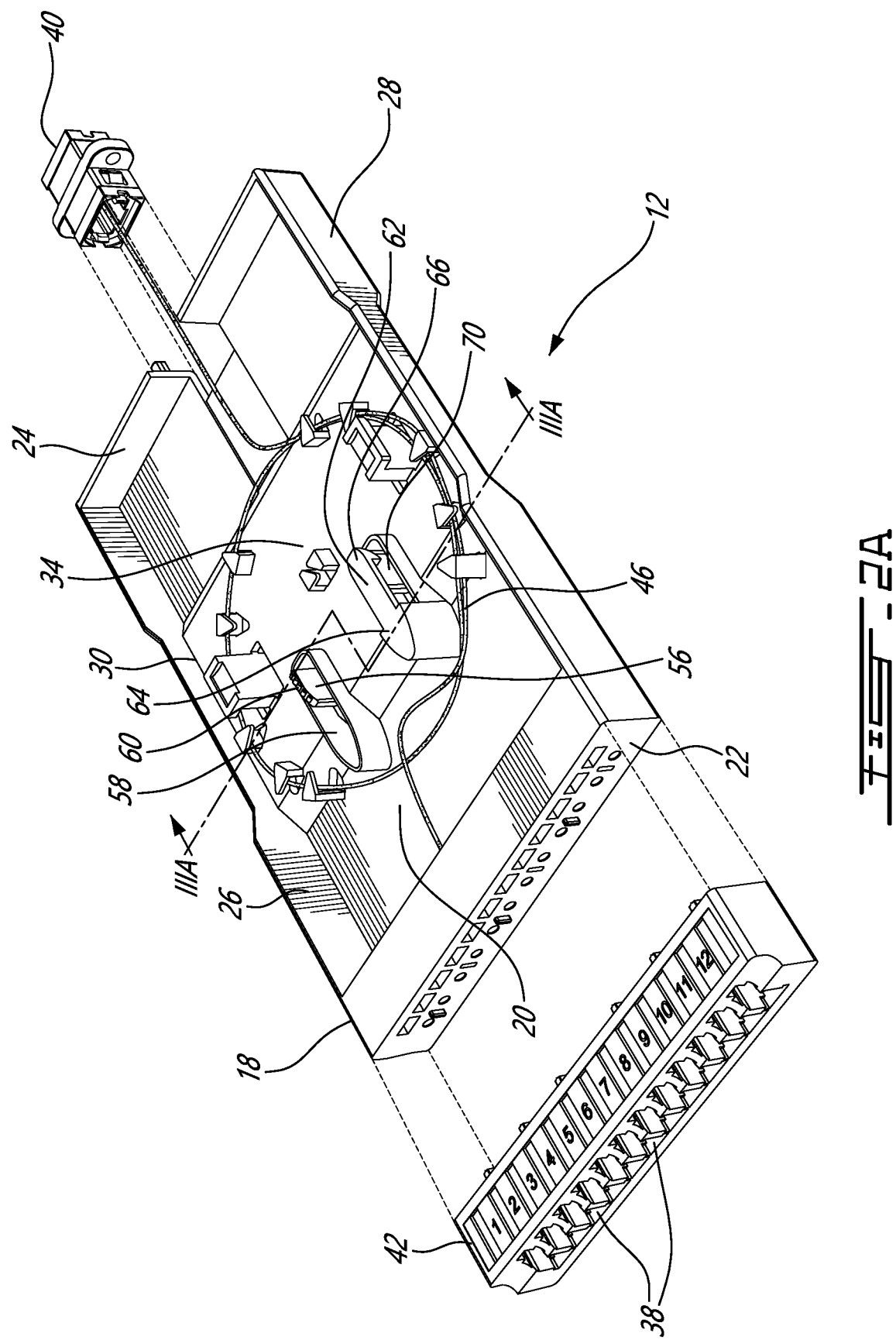
FIG. 2A provides an exploded raised right front perspective view of a cassette in accordance with an illustrative embodiment of the present invention.

Referring now to FIG. 1, a reversible cassette and system, generally referred to using the reference numeral 10, will now be described. The cassette and system 10 comprises one or more cassettes 12 which are releasably mounted to a tray 14 comprising a plurality of cassette engaging features 16. The tray 14 is typically slideably mounted with other trays in a case which is dimensioned for securing in a 19" inch rack or the like (both not shown).

Referring now to FIGS. 2A and 2B, in a first embodiment each cassette 12 comprises a cassette body 18 comprising a bottom 20 and front 22 and back 24 opposite the front and interconnected by a pair of opposed side edges 26, 28 which run along respective outer edges 30, 32 of the bottom 20. The bottom 20, front 22, back 24 and opposed side edges 26, 28 together define a cable receiving region 34 above a first surface 36 of the bottom 20. A plurality of optic fiber receptacles 38 are arranged along the front 22 of the cassette body 18 and illustratively a multifiber receptacle 40 is arranged along the back 24. In one embodiment the optic fiber receptacles 38 are molded or otherwise formed as a block 42 mountable to the front 22 of the cassette body 18, for example using mechanical interlock, ultrasonic welding or an adhesive or the like. The receptacles 38 are configured for receiving a standard LC type plug for example terminating a single fiber optic cable or the like (both not shown). Additionally, the spacing between the optic fiber receptacles 38 is such that any two optic fiber receptacles 38 can receive two plugs (also not shown) in a duplex configuration. In one embodiment the multi fiber receptacle 40 is configured for receiving a standard MPO type plug terminating a 12× multi-fiber cable or the like (both not shown).

Still referring to FIGS. 2A and 2B, the cable receiving region 34 comprises a plurality of cable retaining features 44 arranged on the first surface 36 of the bottom 20 along a generally circular path to receive and retain a plurality of optic fiber segments 46.

Referring back to FIG. 1 in addition to FIGS. 2A and 2B, a tray engaging feature 48 positioned in an aperture and comprising a fixed end 50 connected to an inner edge/ surface of the aperture and a flexible end 52 by a flexible member is provided that extends beyond a second surface 54 of the bottom 20 and is configured for engaging with one of the plurality of cassette engaging features 16 when the cassette 12 is arranged on the tray 14 in a first orientation. The flexible member biases the flexible end 52 into a normally engaged position.

Figure 2C:
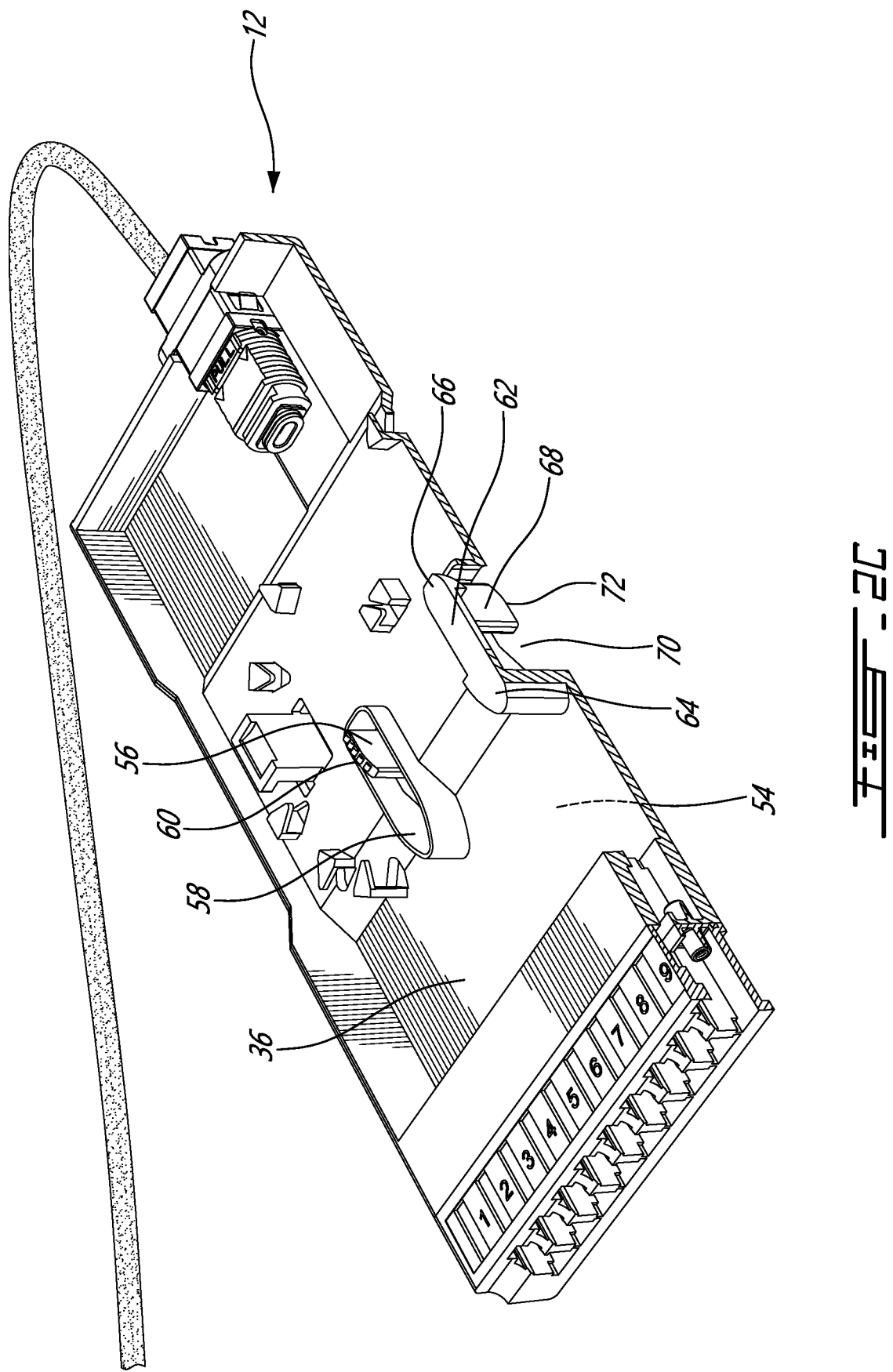
FIG. 2C provides a sectional view along line IIC-IIC in FIG. 1.
Figure 20:
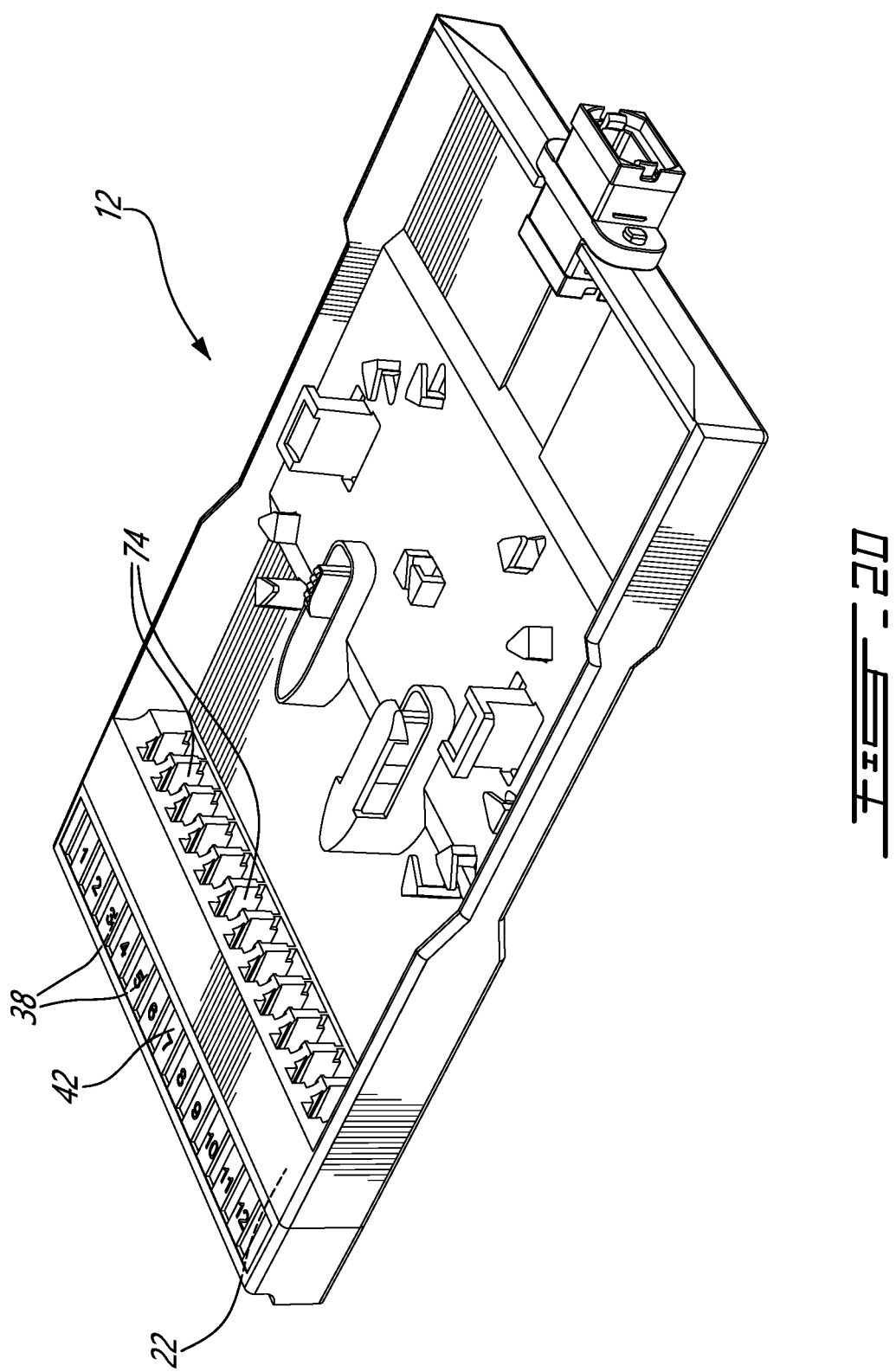

Referring to FIG. 2C in addition to FIGS. 1, 2A and 2B, in a first embodiment of the cassette 12, a first actuator 56 is further provided which extends from the flexible end 52 through an aperture 58 in the bottom 20. As a person of ordinary skill in the art will now understand, the actuatable surface 60 of the first actuator 56 is accessible from the side of the first surface 36 of the cassette 12 when the cassette 12 is installed in a first orientation on the tray 14.

Still referring to FIGS. 1, 2A, 2B and 2C, in the first embodiment of the cassette 12, a second tray engaging feature 62 also comprising a fixed end 64 and a flexible end 66 is also provided extending above the first surface 36 of the bottom 20 and is configured for engaging with one of the plurality of cassette engaging features 16 when the cassette 12 is arranged on the tray 14 in a second reversed orientation. In the first embodiment of the cassette 12, a second actuator 68 is further provided which extends from the flexible end 66 through an aperture 70 in the bottom 20. As a person of ordinary skill in the art will now understand, an actuatable surface 72 of the second actuator 68 is accessible from the side of the second surface 54 of the cassette 12 when the cassette 12 is installed in a second reversed orientation on the tray 14.

Referring now to FIG. 2D in addition to FIG. 2A, as discussed above in one embodiment the receptacles 38 are molded together as a block 42, illustratively a block 42 of twelve (12) LC type receptacles. Similarly, an inside of the front 22 of the cassette body 18 comprises a plurality of receptacles 74 molded or otherwise formed therein. In one embodiment, the receptacles 74 are configured for receiving a standard LC type plug (not shown) for example terminating a single fiber optic cable (reference 46 in FIG. 2A) or the like. As discussed above, the block 42 of receptacles 38 is attached to the front 22, for example by sonic welding, a suitable adhesive or the like and such that the receptacles 38 align with the receptacles 74, with each receptacle 38/receptacle 74 pair acting as a coupler assembly interconnecting optic fibers (not shown) terminated at each receptacle 38, 74 pair and such that the ferrules (not shown) of each pair of terminated optic fibers are arranged along the same axis.

Referring now to FIG. 3A, in order to stabilize the cassette 12 when it is on the tray 14 a pair of stabilizing members 76, 78 are provided. Each member 76, 78 comprises a first L shaped slot engaging portion 80 which extends beyond the first surface 36 of the bottom 20 of the cassette body 18 and a second L shaped slot engaging portion 82 which extends beyond the second surface 54 of the bottom 20 of the cassette body 18. Each stabilizing member 76 is illustratively positioned within a respective aperture 84, 86. A flat center portion 88 of each of the stabilizing members 76, 78 is secured to the cassette body 18 within their respective apertures 84, 86.

Referring to FIGS. 1 and 3B in addition to FIG. 3A, on insertion of the cassette 12 onto the cassette engaging features 16 in the first orientation, the stabilising members 76, 78 are engaged within respective ones of a plurality of spaces 90 provided in the strip 18 between each of the cassette engaging features 16 and such that the tray 14 is held between each second L shaped slot engaging portion 82 and the second surface 54 of the bottom 20 of the cassette body 18. Additionally, on insertion of the cassette 12 onto the cassette engaging features 16 in the first orientation the actuator 56 is slid into a slot 92 in the selected cassette engaging feature 16 and a hook 94 on the flexible end 52 of the tray engaging feature 48 moves into an aperture 96 in the cassette engaging feature 16. A person of ordinary skill in the art will now understand that the hook 94 is biased into the aperture 96 by the flexible end 52 and such that the cassette 12 is securely held to the tray 14. Similarly, in order to release the cassette 12 from the tray 14, the actuator 56 is depressed thereby biassing the hook 94 out of the aperture 96 in the cassette engaging feature 16 thereby allowing the cassette 12 in the first orientation to be retracted from the tray 14.

Still referring to FIGS. 1 and 3A and 3B, a person of ordinary skill in the art will understand that on insertion of the cassette 12 onto the cassette engaging features 16 in the second orientation, the stabilising members 76, 78 are engaged within respective ones of a plurality of spaces 90 provided in the strip 18 between each of the cassette engaging features 16 and such that the tray 14 is held between each second L shaped slot engaging portion 82 and the upper edge 98 of the outer edges 26, 28. Additionally, on insertion of the cassette 12 onto the cassette engaging features 16 in the second orientation the actuator 72 is slid into the slot 92 in the selected cassette engaging feature 16 and a hook 100 on the flexible end 66 of the tray engaging feature 62 moves into the aperture 96 in the cassette engaging feature 16. As discussed above, the hook 100 is biased into the aperture 96 by the flexible end 66 and such that the cassette 12 is securely held to the tray 14. Similarly, in order to release the cassette 12 from the tray 14, the actuator 72 is depressed thereby biassing the hook 100 out of the aperture 96 in the cassette engaging feature 16 thereby allowing the cassette 12 in the second orientation to be retracted from the tray 14.

Figure 4B:
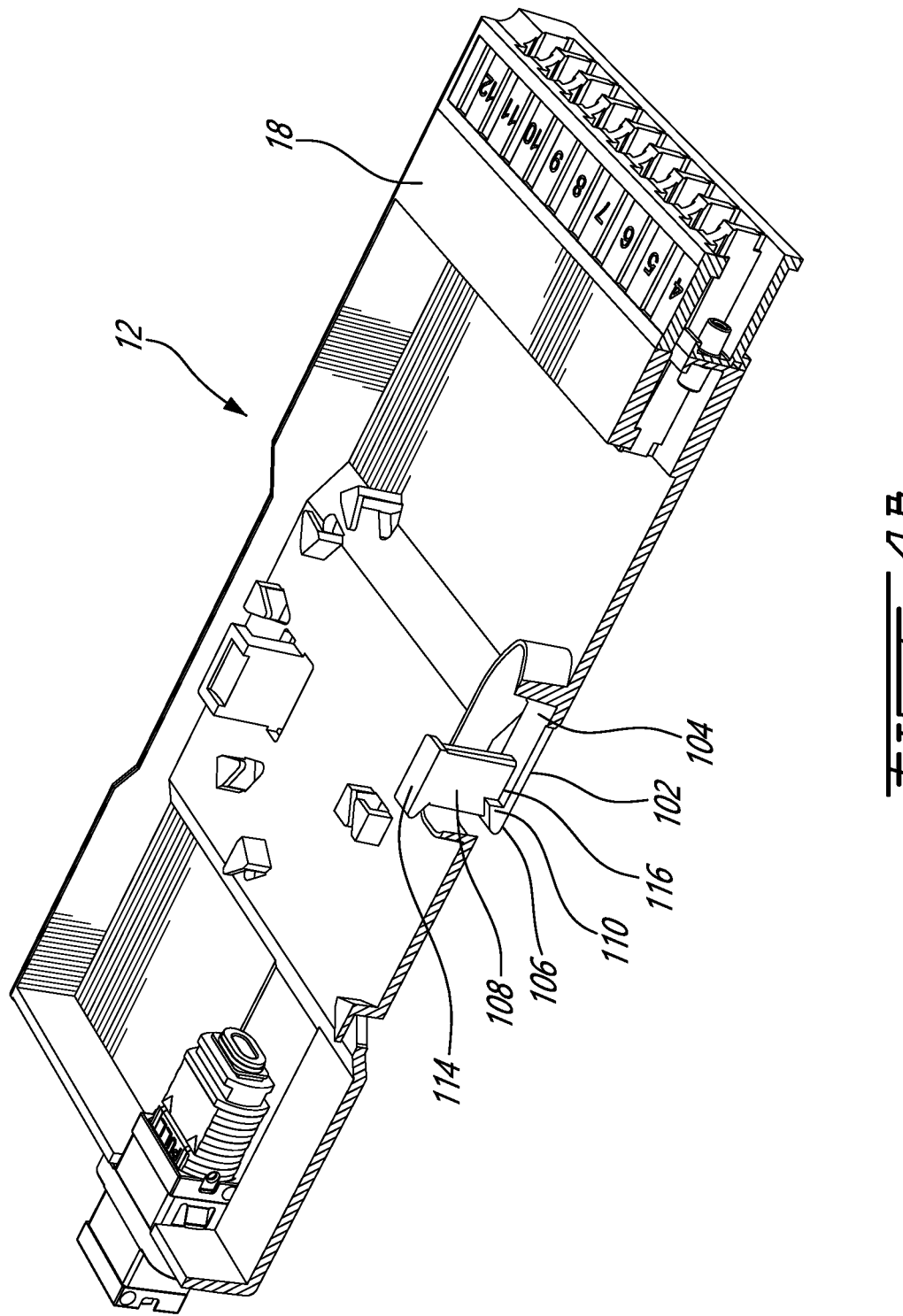
FIG. 4B provides a sectional view along line IVB-IVB in FIG. 4A.

Referring now to FIGS. 4A and 4B, in a second illustrative embodiment of a cassette 12, a two-way tray engaging feature 102 is provided. The two-way tray engaging feature 102 comprises a fixed part 104 secured to the cassette body 18 and a flexible part 106. An actuator 108 is provided on the flexible part 106 which comprises a first hook 110 and a second hook 112, one at each end of the actuator 108. The outer surfaces of the of hooks 110, 112 respectively act as a first actuating surface 114 and a second actuating surface 116 and such that pressing against one or other of the actuating surfaces 114, 116 caused the actuator 108 to bend the flexible part 106 against its own bias.

Referring back to FIG. 1 in addition to FIGS. 4A and 4B, as a person of ordinary skill in the art will now understand, on insertion of the cassette 12 onto the cassette engaging features 16 in the first orientation, the actuator 108 is slid into a slot 92 in the selected cassette engaging feature 16 and the first hook 110 on the flexible end 106 of the tray engaging feature 102 moves into an aperture 96 in the cassette engaging feature 16. The first hook 110 is biased into the aperture 96 by the flexible end 106 and such that the cassette 12 is securely held to the tray 14. Similarly, in order to release the cassette 12 from the tray 14, the first actuator surface 114 is pressed thereby biassing the first hook 110 out of the aperture 96 in the cassette engaging feature 16 and allowing the cassette 12 in the first orientation to be retracted from the tray 14. Similarly, on insertion of the cassette 12 onto the cassette engaging features 16 in the second orientation, the actuator 108 is slid into a slot 92 in the selected cassette engaging feature 16 and the second hook 112 on the flexible end 106 of the tray engaging feature 102 moves into an aperture 96 in the cassette engaging feature 16. The second hook 112 is biased into the aperture 96 by the flexible end 106 and such that the cassette 12 is securely held to the tray 14. Similarly, in order to release the cassette 12 from the tray 14, the second actuator surface 116 is pressed thereby biassing the second hook 112 out of the aperture 96 in the cassette engaging feature 16 and allowing the cassette 12 in the first orientation to be retracted from the tray 14.

Figure 5A:
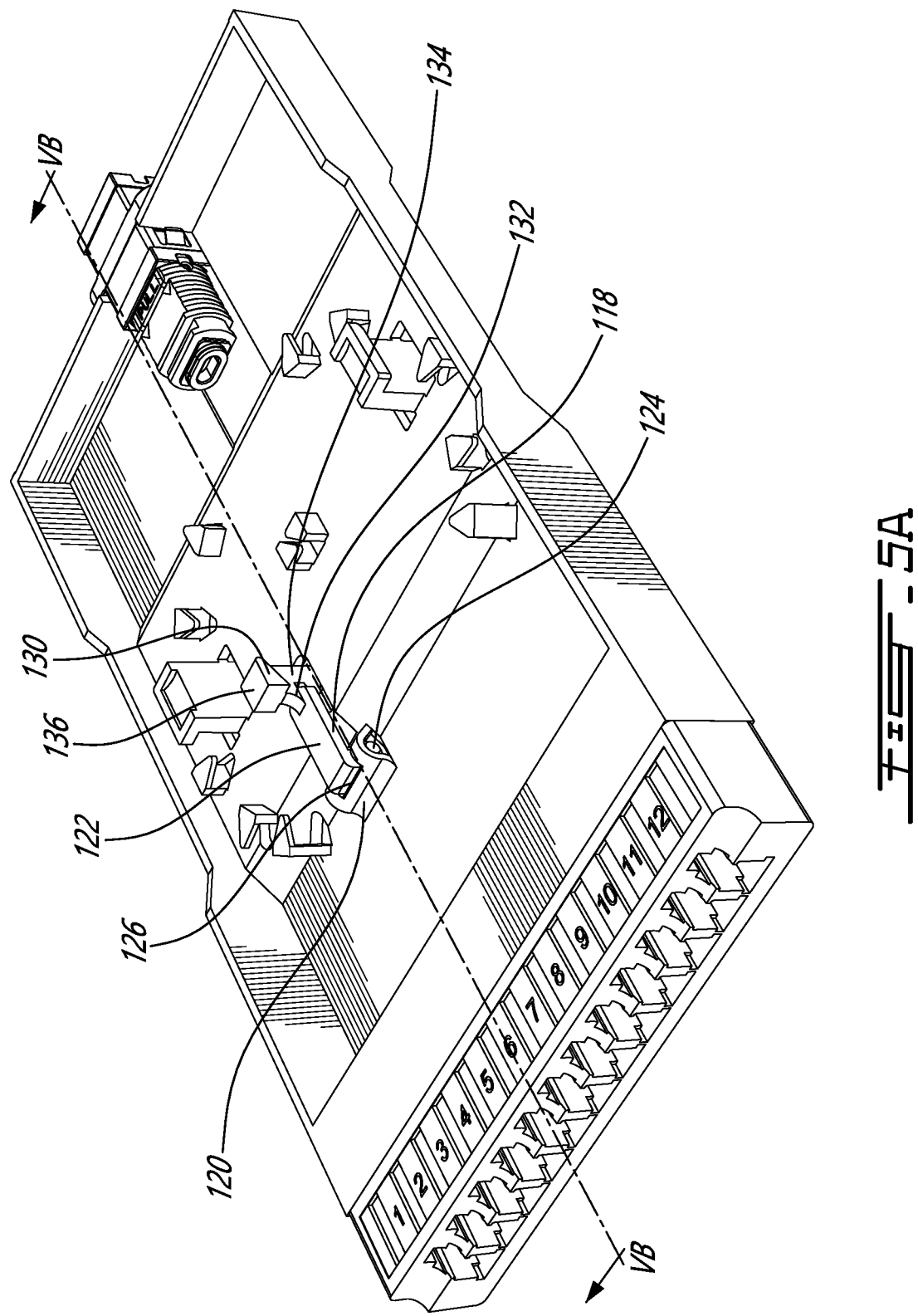
FIG. 5A provides a raised right front perspective view of a cassette in accordance with a third illustrative embodiment of the present invention.

Referring now to FIGS. 5A and 5B, in a third illustrative embodiment of a cassette 12, an two-way tray engaging assembly 118 is provided. The two-way tray engaging assembly 118 comprises a fixed part 120 moulded or otherwise formed in the cassette body 18 and a lever part 122. A barrel-shaped fixed end 124 of the lever part 122 is snap fit into a slot 126 in the fixed part 120. A first tray engaging part 128 and a second tray engaging part 130 are also provided arranged opposite one another at a flexible end 132 of the lever part 122 and spaced by an interconnecting part 134 connected to the flexible end 132 and arranged at right angles to the lever part 122. The outer surfaces of the first tray engaging part 128 and a second tray engaging part 130 respectively act as a first actuating surface 136 and a second actuating surface 138 and such that pressing against one or other of the actuating surfaces 136, 138 causes the lever part 122 to bend against its own bias.

Referring back to FIG. 1 in addition to FIGS. 5A and 5B, as a person of ordinary skill in the art will now understand, on insertion of the cassette 12 onto the cassette engaging features 16 in the first orientation, the interconnecting part 134 is slid into a slot 92 in the selected cassette engaging feature 16 and the first tray engaging part 128 on the flexible end 132 of the lever part 122 moves into an aperture 96 in the cassette engaging feature 16. The first tray engaging part 128 is biased into the aperture 96 by the unbending of the lever part 122 and such that the cassette 12 is securely held to the tray 14. Similarly, in order to release the cassette 12 from the tray 14, the first actuating surface 136 is pressed thereby biassing the first tray engaging part 128 out of the aperture 96 in the cassette engaging feature 16 and allowing the cassette 12 in the first orientation to be retracted from the tray 14. Similarly, on insertion of the cassette 12 onto the cassette engaging features 16 in the second orientation, the interconnecting part 134 is slid into a slot 92 in the selected cassette engaging feature 16 and the second tray engaging part 130 on the flexible end 132 of the lever part 122 moves into an aperture 96 in the cassette engaging feature 16. The second tray engaging part 130 is biased into the aperture 96 by the unbending of the lever part 122 and such that the cassette 12 is securely held to the tray 14. Similarly, in order to release the cassette 12 from the tray 14, the second actuating surface 138 is pressed thereby biassing the second tray engaging part 130 out of the aperture 96 in the cassette engaging feature 16 and allowing the cassette 12 in the first orientation to be retracted from the tray 14.

Although the present invention has been described hereinabove by way of specific embodiments thereof, it can be modified, without departing from the spirit and nature of the subject invention as defined in the appended claims.

The invention claimed is:

1. A reversible fiber optic cassette for mounting in one of a first orientation and a second reversed orientation in a rack comprising a cassette receiving tray, the tray comprising a plurality of stabilizing slots, the cassette comprising:
    a cassette body comprising a bottom comprising a first surface and a second surface;
    at least one stabilizing member held within a respective aperture in said bottom and such that a first L-shaped slot engaging portion of each of said stabilizing members extends above said first surface and a second L-shaped slot engaging portion of each of said stabilizing members extends above said second surface, each of said second L-shaped slot engaging portions for engaging with a respective one of the stabilizing slots when the cassette is on the tray in the first orientation and such that the tray is between an outer end of said second L-shaped slot engaging portions and said second surface and each of said first slot engaging portions for engaging with a respective one of the stabilizing slots when the cassette is on the tray in the second reversed orientation and such that the tray is between an outer end of said first L-shaped slot engaging portion and said first surface.

2. The fiber optic cassette of claim 1, wherein the tray further comprises a plurality of cassette engaging features, the cassette further comprising a first tray engaging feature extending above said second surface and configured for engaging with one of the cassette engaging features when the cassette is on the tray in the first orientation, a second tray engaging feature extending above said first surface and configured for engaging with one of the cassette engaging features when the cassette is on the tray in the second reversed orientation and at least one actuator for selectively disengaging said first tray engaging feature and said second tray engaging feature from an engaged one of the cassette engaging features.

3. The fiber optic cassette of claim 2, further comprising a flexible member biasing each of said tray engaging features into a normally engaged position and further wherein said at least one actuator works against said biasing.

4. The fiber optic cassette of claim 3, comprising a plurality of said flexible members, wherein each of said tray engaging features is positioned within a respective one of a plurality of second apertures in said bottom, and wherein a respective one of said flexible members is positioned between each of said tray engaging features and an inner surface of said respective one of said apertures.

5. The fiber optic cassette of claim 4, wherein said first tray engaging and said second tray engaging feature are positioned at opposite ends of an interconnecting part and further wherein said interconnecting part is positioned within a second aperture in said bottom.

6. The fiber optic cassette of claim 5, wherein said flexible member is interconnected between an inner edge of said aperture and said interconnecting part.

7. The fiber optic cassette of claim 2, further comprising a pair of said first tray engaging features and a pair of said second tray engaging features.

8. The fiber optic cassette of claim 1, wherein said cassette body further comprises a front and a back opposite said front, said bottom, said front, said back defining a cable receiving region above said first surface and further comprising a plurality of optic fiber receptacles arranged along a front of said cassette body, a multifiber receptacle along a back of said cassette body; and a plurality of optic fiber segments, each of said segments arranged within said cable receiving region between a respective one of said optic fiber receptacles and said multifiber receptacle.

9. The fiber optic cassette of claim 8, further comprising a plurality of cable retaining features on said first surface within said cable receiving region and arranged along a generally circular path.

10. A fiber optic cassette for mounting in one of a first orientation and a second reversed orientation in a rack comprising a cassette receiving tray, the tray comprising a plurality stabilizing slots, the cassette comprising:
- a cassette body comprising a bottom comprising a first surface and a second surface;
- at least one stabilising member comprising a flat first part, a flat second part and a flat third part comprising a pair of opposed edges, each of said flat first part and said flat second part interconnected at right angles to a respective one of said opposed edges and such that each of said first part and said second part extend away from said third part in opposite directions;
- wherein said stabilising member is secured within a respective aperture in said bottom and such that said first part is arranged a first distance above and in parallel to said first surface, said flat second part is arranged a second distance below and in parallel to said second surface and said third part intersects said bottom at right angles.

11. The fiber optic cassette of claim 10, wherein said third flat part is elongate and said pair of opposed edges comprise a pair of opposed short edges.

12. The fiber optic cassette of claim 10, wherein said first distance is greater than said second distance.

13. The fiber optic cassette of claim 10, wherein the tray further comprises a plurality of cassette engaging features, the fiber optic cassette further comprising a first tray engaging feature extending above said second surface and configured for engaging with one of the cassette engaging features when the cassette is on the tray in the first orientation, a second tray engaging feature extending above said first surface and configured for engaging with one of the cassette engaging features when the cassette is on the tray in the second reversed orientation and at least one actuator for selectively disengaging said first tray engaging feature and said second tray engaging feature from an engaged one of the cassette engaging features.

14. The fiber optic cassette of claim 13, further comprising a flexible member biasing each of said tray engaging features into a normally engaged position and further wherein said at least one actuator works against said biasing.

15. The fiber optic cassette of claim 14, comprising a plurality of said flexible members, wherein each of said tray engaging features is positioned within a respective one of a plurality of second apertures in said bottom, and wherein a respective one of said flexible members is positioned between each of said tray engaging features and an inner surface of said respective one of said apertures.

16. The fiber optic cassette of claim 15, wherein said first tray engaging and said second tray engaging feature are positioned at opposite ends of an interconnecting part and further wherein said interconnecting part is positioned within a second aperture in said bottom.

17. The fiber optic cassette of claim 16, wherein said flexible member is interconnected between an inner edge of said aperture and said interconnecting part.

18. The fiber optic cassette of claim 2, further comprising a pair of said first tray engaging features and a pair of said second tray engaging features.

19. The fiber optic cassette of claim 10, wherein said cassette body further comprises a front and a back opposite said front, said bottom, said front, said back defining a cable receiving region above said first surface and further comprising a plurality of optic fiber receptacles arranged along a front of said cassette body, a multifiber receptacle along a back of said cassette body; and a plurality of optic fiber segments, each of said segments arranged within said cable receiving region between a respective one of said optic fiber receptacles and said multifiber receptacle.

20. The fiber optic cassette of claim 19, further comprising a plurality of cable retaining features on said first surface within said cable receiving region and arranged along a generally circular path.

* * * * *